United States Patent [19]
Hijikata

[11] Patent Number: 5,055,932
[45] Date of Patent: Oct. 8, 1991

[54] ZOOM LENS APPARATUS WITH AUTO-FOCUSING

[75] Inventor: Isao Hijikata, Yokohama, Japan

[73] Assignee: Victor Company of Japan, Ltd., Yokohama, Japan

[21] Appl. No.: 408,352

[22] Filed: Sep. 18, 1989

[30] Foreign Application Priority Data

Sep. 19, 1988 [JP] Japan .............................. 63-234213

[51] Int. Cl.$^5$ ...................... H04N 5/232; G03B 3/00
[52] U.S. Cl. ..................................... 358/227; 354/402
[58] Field of Search ............... 358/227, 225, 909, 209; 354/400, 402, 404, 406, 407, 408

[56] References Cited

U.S. PATENT DOCUMENTS

| | | | |
|---|---|---|---|
| 4,393,409 | 7/1983 | Kimura | 358/227 |
| 4,404,595 | 9/1983 | Ushiro et al. | 358/227 |
| 4,567,526 | 1/1986 | Tsuchiya | 358/227 |
| 4,903,135 | 2/1990 | Ohtake et al. | 358/227 |
| 4,931,820 | 6/1990 | Matsuzawa et al. | 354/402 |
| 4,950,054 | 8/1990 | Wada et al. | 350/429 |
| 4,975,724 | 12/1990 | Hirasawa et al. | 354/400 |

*Primary Examiner*—Tommy P. Chin
*Assistant Examiner*—Safet Metjahic
*Attorney, Agent, or Firm*—Pollock, VandeSande & Priddy

[57] ABSTRACT

In a zoom lens apparatus with auto-focusing comprising a zoom lens; a focus lens; an imaging device; a signal generation circuit responsive to an output of the imaging device for generating a focus signal indicative of in-focus degree of an optical image on the imaging device; and a control circuit responsive to the focus signal and an external signal indicative of zooming the zoom lens for positioning the zoom and focus lens such that the focus lens position is controlled in accordance with a focus voltage when the external signal is not fed and moved in accordance with one of preset characteristic curves showing position relation between the zoom and focus lenses when the external signal is fed, the characteristic curve being selected according to the focus voltage, another characteristic curve is selected from plural characteristic curves in accordance with a difference between the focus voltages before and after moving the zoom lens or moving the focus lens by a given amount when the external signal indicates the zoom lens is to be moved form wide-angle to telephoto position and for sending the selected curve to the control circuit to prevent blurring on a reproduced image.

2 Claims, 5 Drawing Sheets

ZOOM LENS APPARATUS WITH AUTO-FOCUSING

BACKGROUND OF THE INVENTION

1. Field of the Invention

This invention relates to a zoom lens apparatus with auto-focusing and particularly to a zoom lens apparatus with auto-focusing used for a video camera.

2. Description of the Prior Art

A zoom lens apparatus with auto-focusing is used for taking picture images through a zoom lens system with auto-focusing, which comprises a zoom lens system and a camera body having an imaging device, a drive circuit for zooming the zoom lens system in response to a manipulation switch and moving the focus lens and an auto-focusing circuit for keeping projected optical images on the imaging device in focus by changing the position of a focus lens of the zoom lens system. Such zoom lens apparatus can be used in various types of video cameras. There are two types of zoom lens systems used for such apparatus, namely, front-lens and rear-lens focusing types. In the front-lens focusing type of a zoom lens system, the focus lens is provided on the side of an object with respect to a zoom lens and in the rear-lens focusing type, a focus lens is provided between a zoom lens and the imaging device.

A zoom lens apparatus with auto-focusing using either type of the zoom lens system is operated such that the zoom lens is zoomed by changing the position of the zoom lens in response to a manipulation switch and then, a focus lens is positioned for obtaining just-focus picture images in accordance with a focus signal detected from the imaging device. Position relation between the zoom lens and the focus lens is predetermined with respect to an object distance, i.e., a distance between an object and the zoom lens system, shown by characteristic curves in FIGS. 5 and 6.

The conventional rear-lens focusing type, such as disclosed in the European laid-open patent application No. 260960 filed by the applicant of the present invention, contains a drawback in that a reproduced picture image detected by the imaging device of the apparatus becomes out of focus when the zoom lens system is zoomed from wide-angle to telephoto positions. The reasons are as follows:

If the zoom lens positions at a telephoto position, the auto-focusing circuit detects that the object distance is of characteristic curve U4 because depth of field d1 crosses only the characteristic curve U4, as shown in FIG. 5. However, when the zoom lens position is changed from a wide-angle to telephoto positions, the firstly detected object distance becomes not allowable, because the auto-focusing circuit may detect that the object distance is of characteristic curve U6 at a wide-angle position because depth of field d2 of wide-angle position is approximately the same as depth field d1 of telephoto position and thus, the depth of field d2 crosses the characteristic curves U1 to U4.

Similarly, in the front-lens focusing type, there is also the drawback that a reproduced picture image detected by the imaging device of the apparatus becomes defocused when the zoom lens system is zoomed from wide-angle to telephoto positions. This is because the depth of field d3 at a telephoto position crosses only the characteristic curve U4 but depth of field d4 at a wide-range position crosses characteristic curves from U1 to U7. Therefore, the auto-focusing circuit may detect the distance from the object to be of a characteristic curve other than U4 at a wide-angle position. Therefore, a reproduced picture image detected by the imaging device of the apparatus becomes defocused when the zoom lens system is zoomed from wide-angle to telephoto positions.

SUMMARY OF THE INVENTION

The present invention has been developed in order to remove the above-described drawback inherent to the conventional zoom lens apparatus.

According to the present invention there is provided a zoom lens apparatus with auto-focusing comprising a zoom lens; a focus lens; an imaging device; a signal generation circuit responsive to an output of the imaging device for generating a focus signal indicative of in-focus degree of an optical image on the imaging device; a control circuit responsive to the focus signal and an external signal indicative of zooming the zoom lens for positioning the zoom and focus lens such that the focus lens position is controlled in accordance with a focus voltage when the external signal is not fed and moved in accordance with one of preset characteristic curves showing position relation between the zoom and focus lenses when the external signal is fed, the characteristic curve being selected according to the focus voltage; and a circuit for selecting another characteristic curve from plural characteristic curves in accordance with a difference between the focus voltages before and after moving the zoom lens (rear-lens focusing type) or moving focus lens (front-lens focusing type) by a given amount when the external signal indicates the zoom lens to be moved from wide-angle to telephoto position and for sending the selected curve to the control circuit to prevent blurring on a reproduced image. The sign of the difference indicates whether the actual object distance is near or distant.

According to the present invention there is also provided a zoom lens apparatus with auto-focusing comprising: a zoom lens for receiving a light ray from an object; a focus lens for receiving the light ray from the zoom lens; an imaging device responsive to the light ray from the focus lens for producing a video signal; a first positioning device responsive to a first position signal for positioning the zoom lens; a second positioning device responsive to a second position signal for positioning the focus lens; a focus signal generation circuit responsive to an output of the imaging device for generating a focus signal indicative of in-focus degree of the optical image on the imaging device where the magnitude of the focus signal varies in accordance with the position of the focus lens and a distance between the object and the imaging device; a control circuit responsive to the focus signal and an external command signal for producing the first and second position signals such that the focus lens position is controlled in accordance with the focus signal in the absence of the external command signal, and the zoom and focus lenses are moved along one of preset characteristic curves showing positional relationship between the zoom and focus lenses for plural distance between an object and the imaging device in the presence of the external command signal, one of the characteristic curves being selected according to the focus signal; and a circuit for selecting another characteristic curve from the plural characteristic curves in accordance with a difference between the focus signal before and after moving the zoom lens by a given amount when the external command signal is for zooming from wide-angle to telephoto positions, and for causing the control circuit to use another characteristic curve in place of a former one.

According to the present invention there is further provided a zoom lens apparatus with auto-focusing comprising: a focus lens for receiving a light ray from an object; a zoom lens for receiving the light ray from the focus lens; an imaging device responsive to the light ray from the zoom lens for producing a video signal; a first positioning device responsive to a first position signal for positioning the zoom lens; second positioning device responsive to a second position signal for positioning the focus lens; a focus signal generation circuit responsive to an output of the imaging device for generating a focus signal indicative of in-focus degree of the optical image on the imaging device where the magnitude of the focus signal varies in accordance with the position of the focus lens and a distance between the object and the imaging device; control circuit responsive to the focus signal and an external command signal for producing the first and second position signals such that the focus lens position is controlled in accordance with the focus signal in the absence of the external command signal, and the zoom and focus lenses are moved along one of preset characteristic curves showing positional relationship between the zoom and focus lenses for plural distance between an object and the imaging device in the presence of the external command signal, one of the characteristic curves being selected according to the focus signal; and a circuit for selecting another characteristic curve from the plural characteristic curves in accordance with a difference between the focus signal before and after moving the focus lens by a given amount when the external command signal is for zooming from wide-angle to telephoto positions, and for causing the control circuit to use another characteristic curve in place of a former one.

BRIEF DESCRIPTION OF THE DRAWINGS

The object and features of the present invention will become more readily apparent from the following detailed description taken in conjunction with the accompanying drawings in which.

The same or corresponding elements or parts are designated at like references throughout the drawings.

DETAILED DESCRIPTION OF THE INVENTION

Figure 1:
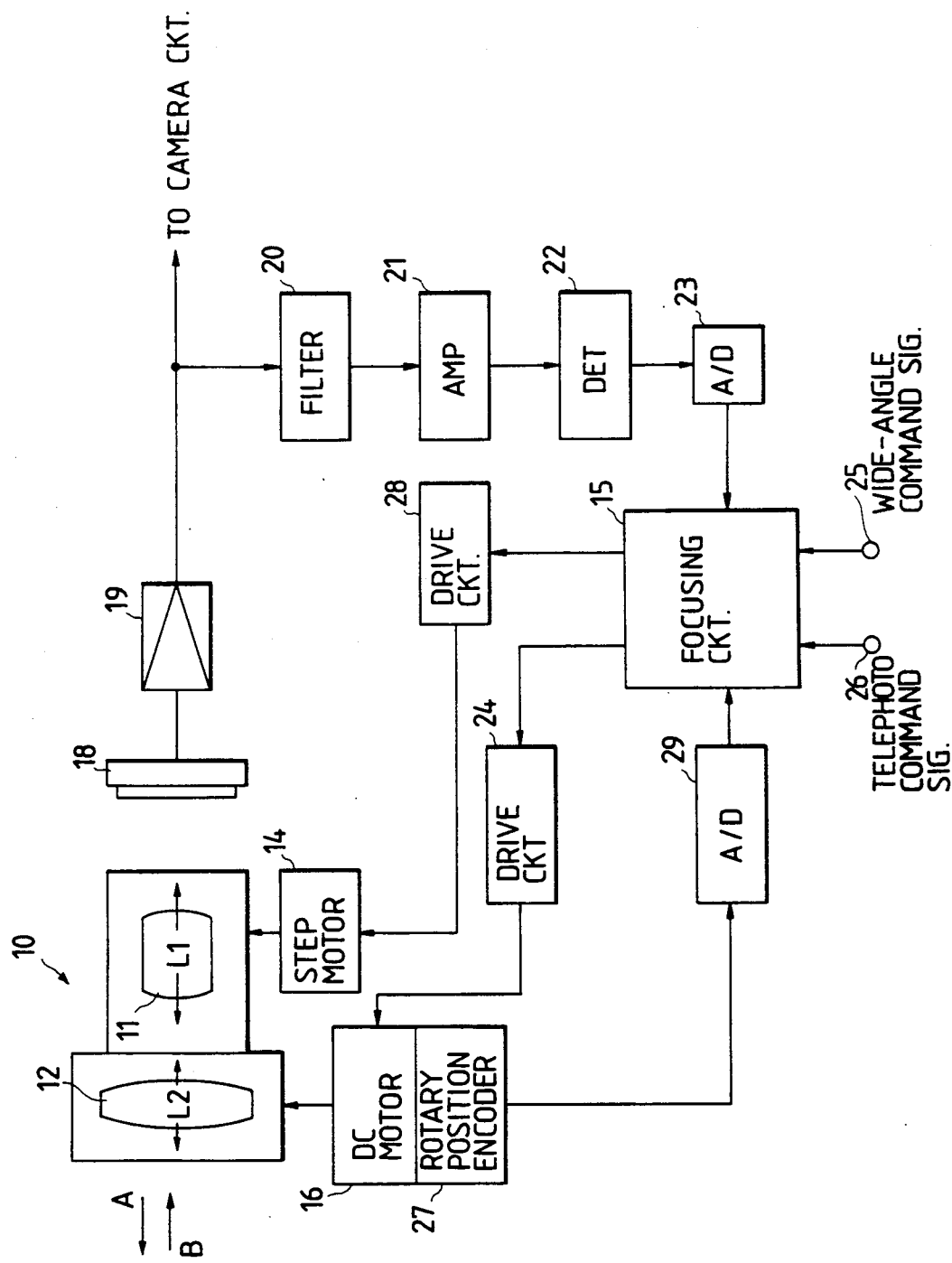
FIG. 1 is a block diagram of a first embodiment of a zoom lens apparatus of the invention.

Referring now to the drawings, FIG. 1 is a block diagram of a first embodiment of a zoom lens apparatus with auto-focusing of the invention.

Figure 7:
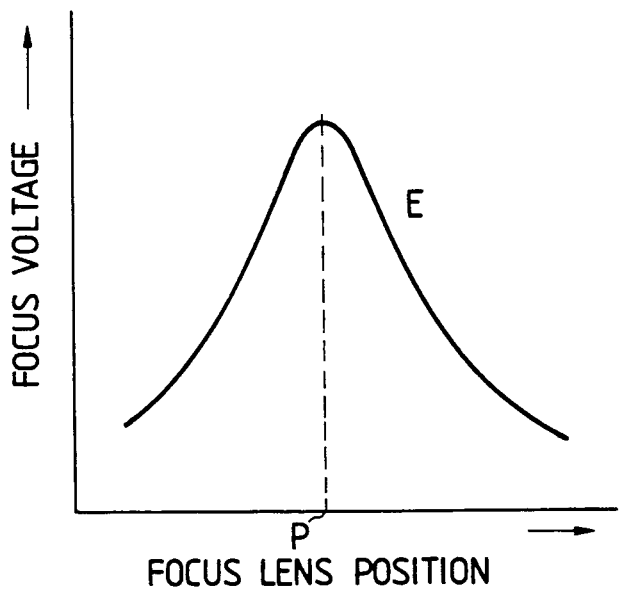
FIG. 7 shows a characteristic curve of a focus signal of FIG. 1.

In FIG. 1, a light ray from an unshown object impinges upon to a zoom lens 12 of rear-lens focusing type zoom lens system 10. The zoom lens 12 focuses the light ray onto an imaging device (charge coupled device) 18 through a focus lens 11 with its focal length changed by changing its position L2. The focus lens 11 produces a just-focus image of the object by changing its position L2. The zoom lens 12 and focus lens 11 are moved along the optical axis of the zoom lens system 10 within predetermined ranges respectively and in the directions "A" or "B", as shown. The imaging device 18 converts the focused picture image of the object into a video signal. The video signal is amplified by the amplifier 19 and sent to a well-known camera circuit for producing a standard video signal and to a well-known focus signal generation circuit comprising; a filter 20 for extracting high-frequency components; amplifier 21 for amplifying the video signal from the filter 20; and a detector 22 for detecting high-frequency components and produces a focus signal. The focus signal is sent to a focusing circuit 15 through an a/d converter 23 for converting the signal from the detector 22 into a digital signal. The gain of the amplifier 21 may be controlled for matching a range of the focus signal to that of a converter 23. The focus signal shows a characteristic curve shown in FIG. 7 which indicates in-focus degree. The top of the curve indicates a just focus position of the focus lens 11. The focusing circuit 15 produces a first drive signal for a dc motor 16 in response to a wide-angle command signal 25 and telephoto command signal 26. The first drive signal is supplied to the dc motor 16 through a drive circuit 24. The dc motor 16 moves the zoom lens 12 along the optical axis of the zoom lens system 10 in response to the first drive signal. Rotary positions of the dc motor 16 are detected by a rotary position encoder 27. The detected position signal is sent to the focusing circuit 15 through an a/d converter 29. The focusing circuit 15 also produces a second drive signal in response to the focus signal. The second drive signal is supplied to a step motor 14 through a drive circuit 28. The step motor 14 drives the focus lens 11 along the optical axis. The position of the focus lens 11 is obtained by counting the second drive signal by the focusing circuit 15. The focus lens 11 is moved so as to maximize a level of the focus signal to obtain just-focus image on the imaging device 18. This is focusing processing.

When the wide-angle or telephoto command signal is fed to the focusing circuit 15, i.e., when zooming, the focusing circuit 15 produces the first drive signal to change the position of the zoom lens 12. The focus lens 11 is moved as follows:

A characteristic curve U4 is selected in accordance with the focus signal indicative of the object distance and then, the position of the focus lens 11 is given by the position of the zoom lens 12 through the characteristic curve U4. The second drive signal is produced so that the focus lens 11 positions at that position.

This is "zoom tracking". Position relation between the zoom lens 12 and the focus lens 11 is predetermined with respect to an object distance, i.e., a distance between an object and the zoom lens system, shown by characteristic curves in FIG. 5. The characteristic curves U1 to U7 are previously stored in the focusing circuit 15 in a data table form. For example, the characteristic curve U7 is used for an object distance of 1m, U1 for an object distance of ∞.

Figure 2:
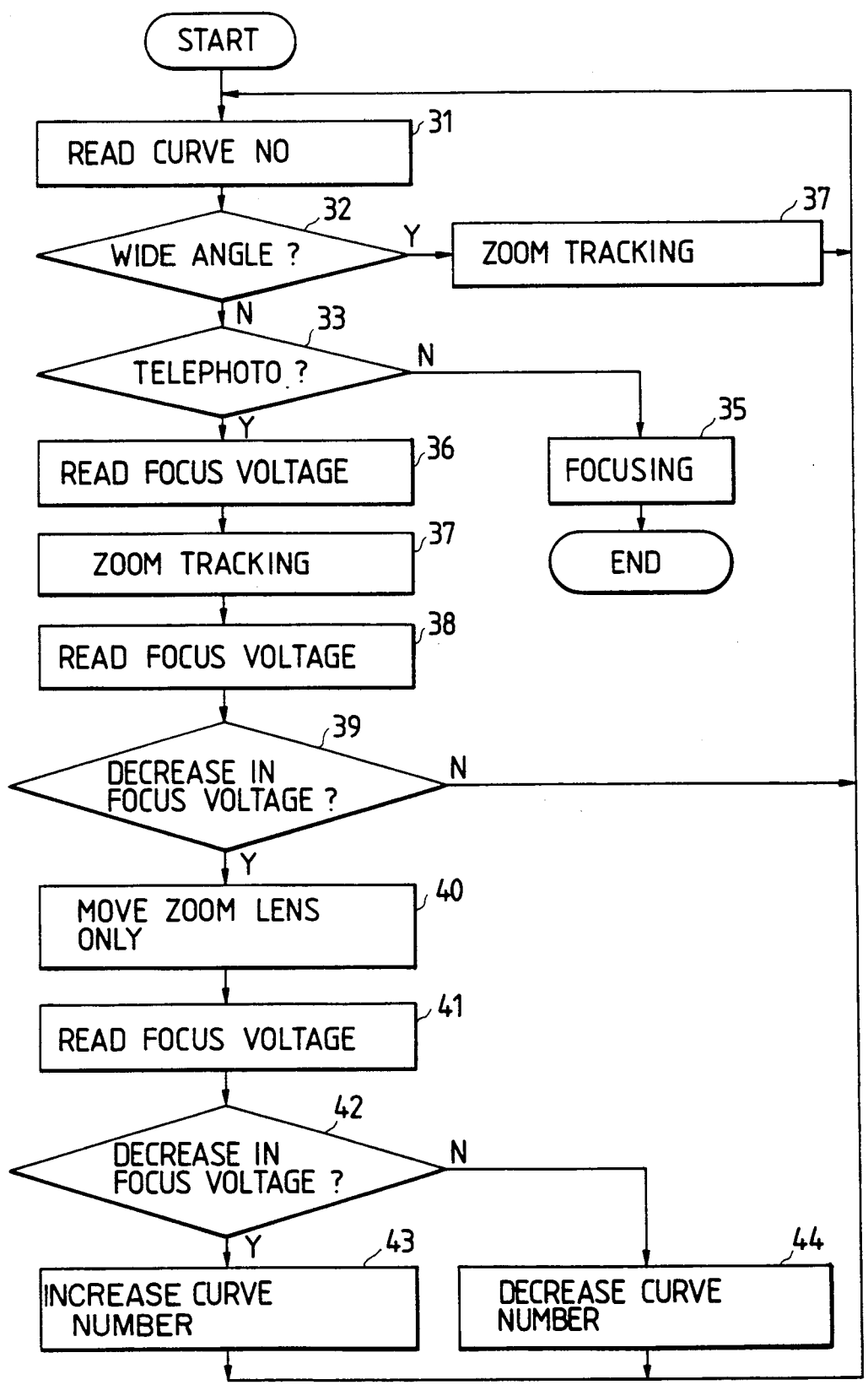
FIGS. 2 and 3 show flow charts for the first embodiment.

When zooming is made from a wide-angle position to a telephoto position, the focusing circuit 15 performs a process shown in FIG. 2 prevent the reproduced image to from being blurred. The process shown in FIG. 2 is for the rear-lens focusing type.

The focusing circuit 15 comprises an unshown cpu which executes the processing shown in FIG. 2 in response to the wide-angle and telephoto command signals 25 and 26. The processing starts from the step 31. In step 31, the cpu reads the curve number and stores it, for example, U4. A judgment is made in the following step 32, as to whether the wide-angle command signal is fed. If the wide-angel command signal is fed, processing proceeds to step 37 for zoom tracking. If a wide-angle command signal is not fed, a judgment is made in the following step 33, as to whether the telephoto command signal is supplied. If the telephoto command signal is not supplied, the processing proceeds to step 35 for the focusing process mentioned above. If the telephoto command is fed, the cpu reads the focus voltage and store a first value of the focus voltage in step 36 and processes a zoom tracking step 37 described later. In the following step 38, the cpu read focus voltage again. A judgment is made in step 39, as to whether focus voltage decreases by comparing the focus voltage obtained in steps 36 and 38. If the focus voltage does not decrease, the processing returns to step 31. If it decreases, the cpu moves the zoom lens 12 toward a telephoto position by a given distance but does not move the focus lens 11 because this process gives the cpu an information of error in the number of the characteristic curve. The cpu reads the focus voltage in the following step 41 again. A judgment is made in the following step 42, as to whether the focus voltage decreases. If it decreases, the cpu increases the number of the characteristic number stored by one in the step 43, so that the number becomes U5. If not, the cpu decreases the number of the characteristic curve by one in the step 44, so that the number becomes U3. Processing proceeds to the step 31 from the steps 43 and 44. The loop including steps from 31 to 43 or 44 is executed while the zoom command signal is fed.

Figure 5:
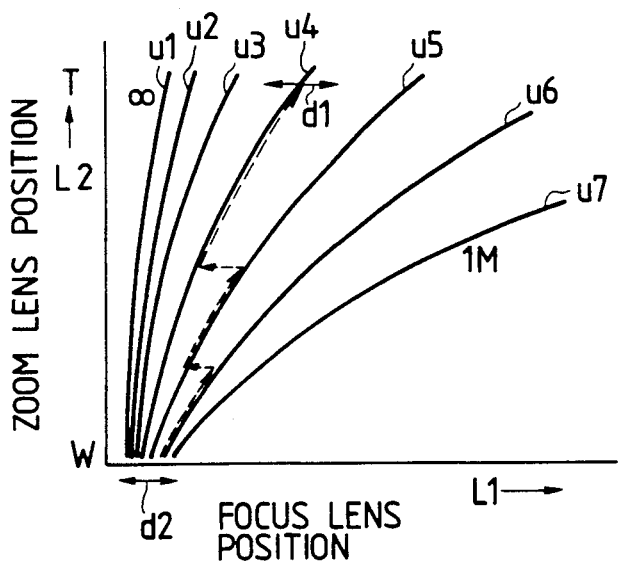
FIG. 5 shows zoom lens characteristic curves for illustrating the operation of the first embodiment.

Because the characteristic curves U1 to U7 for the rear-lens focusing type are inclined, as shown in FIG. 5, it is possible to detect whether the number of the characteristic curves should be increased or decreased in steps 38 to 43 by comparison of stored focus voltage and another focus voltage obtained after moving the zoom lens by a predetermined length in order to obtain an actual object distance.

Figure 3:
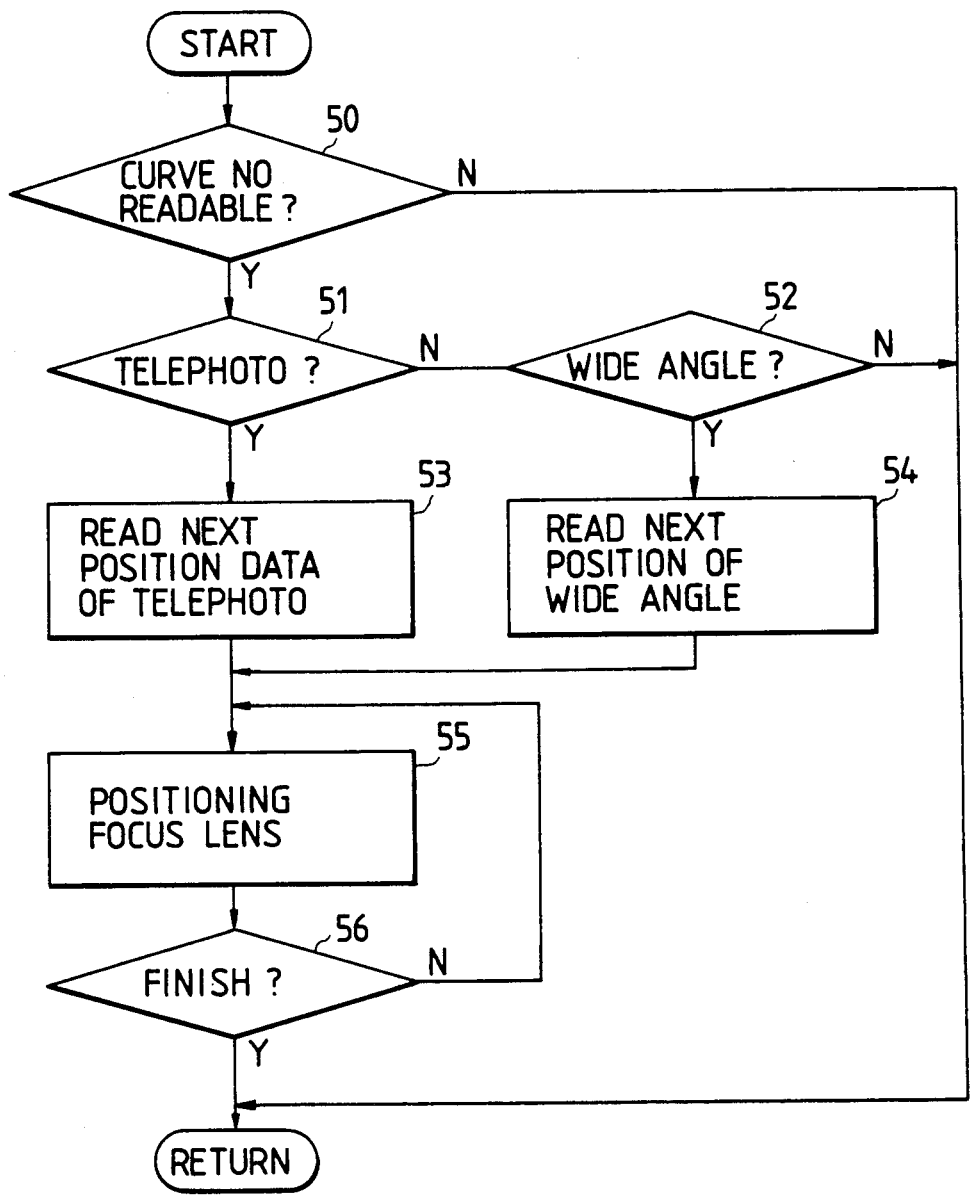

FIG. 3 shows a flow chart for zoom tracking 37. The cpu begins processing at step 50. A judgment is made in step 50 as to whether the number of the characteristic curve has been read. If a number other than the numbers U1 to U7 is read the processing finishes and returns to the main routine. A judgment is made in the following step 51 as to whether the telephoto command is fed. If so, the cpu reads a next position data of telephoto side from the data table mentioned above. In the following step 55 the cpu produces a second drive signal to position the focus lens 11 to obtain just-focus image. This step is repeated by judging step 56 until the cpu detects that position data from the rotary encoder 27 is consistent with the position data obtained in the step 55. When the positioning is finished the processing returns to the main routine. If the telephoto command is not fed in step 51, the cpu detects whether the wide-angel command is fed in step 52. If the wide-angle command is fed, the cpu reads a next position data of wide-angle side in step 54 and executes step 55. If the cpu judges that the side-angle command signal is not fed in the step 52, processing returns to the main routine.

As described above, in the rear-lens focusing type, when zooming from a wide-angle position to a telephoto position is made and thus the focus voltage decreases, the number of the characteristic curve is changed to prevent the reproduced image from being blurred. For example, in FIG. 5, an object distance corresponds to the characteristic curve U4. If at a wide angle position the focusing circuit 15 detects that the object distance corresponds to the characteristic curve U6 due to depth of focus, as the zoom lens is moved to a telephoto position, the number of the characteristic curve is changed as shown by a dot line in the drawing.

Hereinbelow will be described a second embodiment of a zoom lens apparatus.

In the front-lens focusing type, the zoom lens apparatus has the same structure as that of the rear-lens type except for a portion of processing of the cpu and that the focus lens 11 is provided before the zoom lens 12. In the front-lens type zoom lens apparatus, the cpu executes processing of a flow chart shown in FIG. 4 where only step 45 is different from the flow chart of FIG. 3. Step 45 corresponds to step 40 of FIG. 2. Therefore, the description of the operation is made only for step 45.

Figure 4:
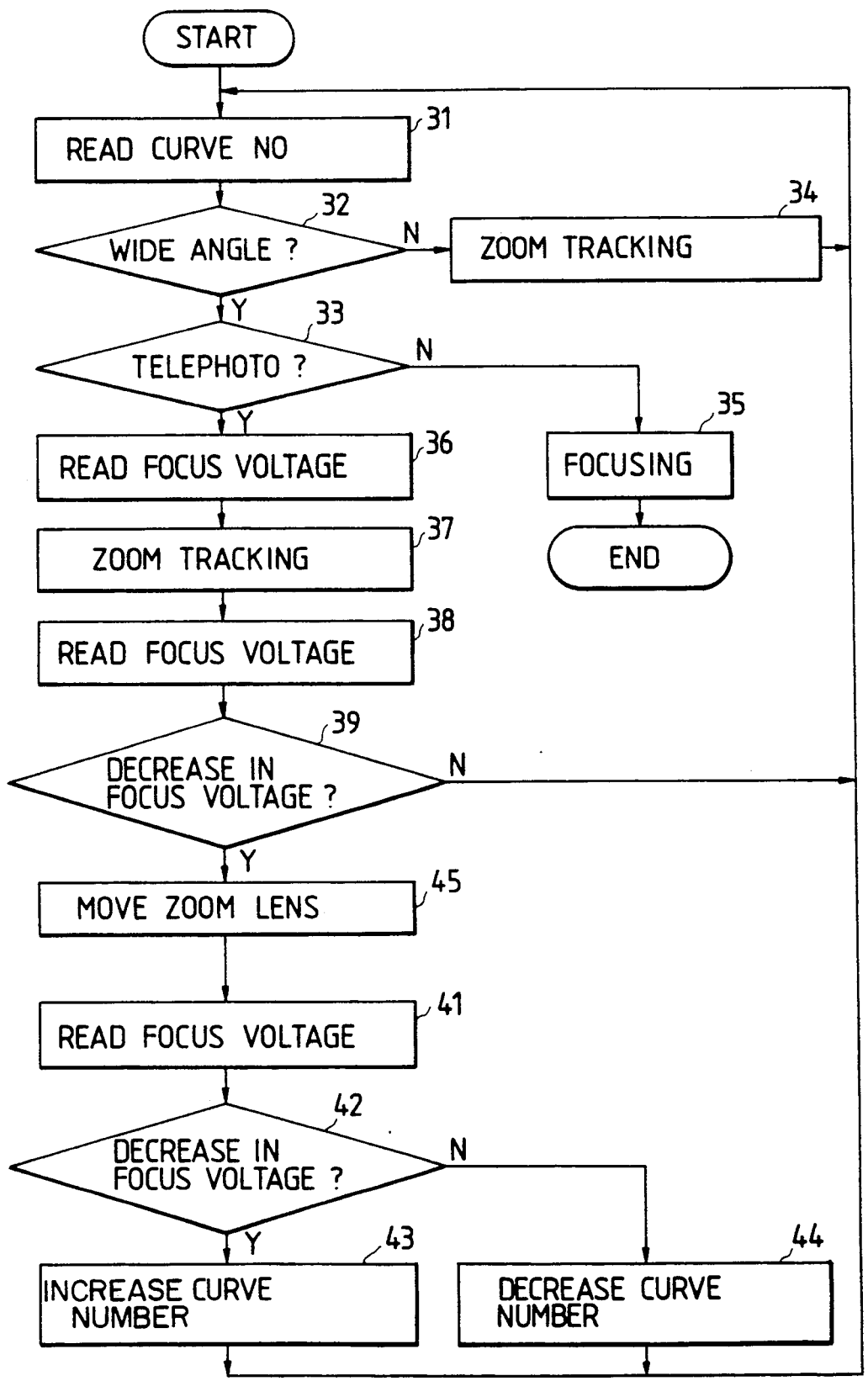
FIG. 4 shows a flow chart of the second embodiment.
Figure 6:
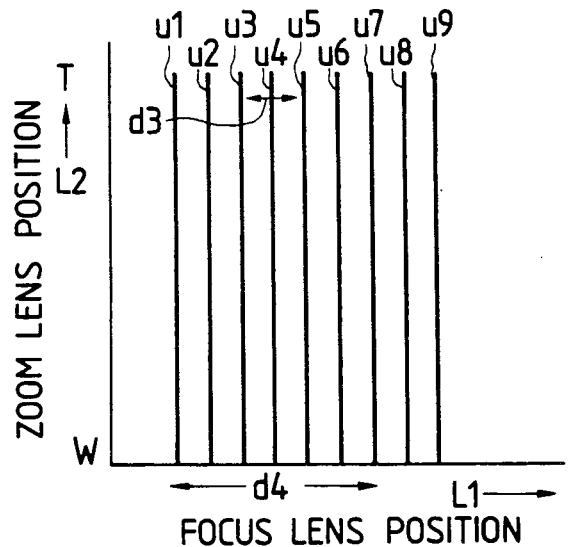
FIG. 6 shows zoom lens characteristic curves for illustrating the operation of the second embodiment.

In FIG. 4, if it is detected by the cpu that the focus signal decreases, processing proceeds to step 45. In step 45, the cpu produces a second drive signal to move the focus lens such that position amount L1 is increased by a predetermined amount. In the following steps 41 to 43 or 44, the number of the characteristic curve is changed similar to the rear-lens type zoom lens apparatus. This is because if the zoom lens is moved, the focus signal does not indicate that the focus lens position is in error since the characteristic curve of the front-lens type does not incline, as shown in FIG. 6. Therefore, in step 45 the focus lens is moved, so that the number of the characteristic curve is corrected.

What is claimed is:

1. A zoom lens apparatus with auto-focusing comprising:
   (a) a zoom lens for receiving a light ray from an object;
   (b) a focus lens for receiving said light ray from said zoom lens;
   (c) an imaging device responsive to said light ray from said focus lens for producing a video signal;
   (d) first positioning means responsive to a first position signal for positioning said zoom lens;
   (e) second positioning means responsive to a second position signal for positioning said focus lens;
   (f) focus signal generation means responsive to an output of said imaging device for generating a focus signal indicative of in-focus degree of said optical image on said imaging device where the magnitude of said focus signal varies in accordance with the position of said focus lens and a distance between said object and said imaging device;
   (g) control means responsive to said focus signal and an external command signal for producing said first and second position signals such that said focus lens position is controlled in accordance with said focus signal in the absence of said external command signal, and said zoom and focus lenses are moved along one of preset characteristic curves showing positional relationship between said zoom and focus lenses for plural distance between an object and said imaging device in the presence of said external command signal, said focus lens being intermittently stopped for a given interval to detect a change in a magnitude of said focus signal between said focus signal before and after stopping said focus lens when said external command signal is for zooming from wide-angle to telephoto position, one of said characteristic curves being selected according to said focus signal; and (h) means for selecting another characteristic curve from said plural characteristic curves in accordance with said change when said external command signal is for zooming from wide-angle to telephoto positions, and for causing said control means to use said another characteristic curve in place of a former one.

2. A zoom lens apparatus with auto-focusing comprising a zoom lens, a focus lens, an imaging device, signal generation means responsive to an output of said imaging device for generating a focus signal indicative of in-focus degree of an optical image on said imaging device and control means responsive to said focus signal and an external command signal for zooming said zoom lens for positioning said zoom and focus lenses such that said focus lens position is controlled in accordance with said focus signal in the absence of said external signal, the improvement comprising:

second control means responsive to said focus signal and said command signal for zooming said zoom lens for positioning said zoom and focus lenses such that said zoom and focus lenses are moved along one of preset characteristic curves showing positional relationship between said zoom and focus lenses for plural distances between an object and said imaging device and said focus lens is intermittently stopped for a given interval to detect a change in a magnitude of said focus signal between said focus signal before and after stopping said focus lens when said external command signal is for zooming from wide-angle to telephoto position, one of said characteristic curves being selected according to the focus signal; and means for selecting another characteristic curve from said plural characteristic curves in accordance with said change when said external command signal is for zooming from wide-angle to telephoto position, and for causing said control means to use said another characteristic curve in place of a former one.

* * * * *